(12) United States Patent
DeLanghe et al.

(10) Patent No.: US 10,486,729 B2
(45) Date of Patent: Nov. 26, 2019

(54) WHEELED DEVICE FOR SNOWMOBILE SKI

(71) Applicant: Caliber, Inc., Burnsville, MN (US)

(72) Inventors: Ernest J. DeLanghe, Burnsville, MN (US); Steven W. Potter, Prior Lake, MN (US); Paul Dathe, Plymouth, MN (US); Gregory Joseph Wright, Milaca, MN (US); Randall Seurer, Lonsdale, MN (US)

(73) Assignee: CALIBER, INC., Burnsville, MN (US)

( * ) Notice: Subject to any disclaimer, the term of this patent is extended or adjusted under 35 U.S.C. 154(b) by 0 days.

(21) Appl. No.: 16/106,974

(22) Filed: Aug. 21, 2018

(65) Prior Publication Data
US 2019/0061801 A1 Feb. 28, 2019

Related U.S. Application Data

(60) Provisional application No. 62/548,648, filed on Aug. 22, 2017.

(51) Int. Cl.
| | |
|---|---|
| *B62B 13/08* | (2006.01) |
| *B62B 13/18* | (2006.01) |
| *B62M 27/02* | (2006.01) |

(52) U.S. Cl.
CPC ............ *B62B 13/08* (2013.01); *B62B 13/18* (2013.01); *B62M 27/02* (2013.01); *B62M 2027/025* (2013.01)

(58) Field of Classification Search
CPC ..... B62B 15/009; B62B 15/008; B62B 13/08; B62B 13/18

(Continued)

(56) References Cited

U.S. PATENT DOCUMENTS

| 1,123,676 A | * | 1/1915 | Bule | ...................... B62B 13/18 |
| | | | | 280/8 |
| 1,744,654 A | * | 1/1930 | Lorenzen | ................ B62B 13/18 |
| | | | | 280/47.131 |

(Continued)

OTHER PUBLICATIONS

Skisaver Flex—Spara skoterns skidor med Skisaver®; http://www.safedriving.se/skisaver, 6 pages, website Jun. 27, 2019.

(Continued)

*Primary Examiner* — Jeffrey J Restifo
(74) *Attorney, Agent, or Firm* — Westman, Champlin & Koehler, P.A.

(57) ABSTRACT

A device for attaching to a ski of a snowmobile includes first and second spaced apart legs. Each leg has a ski engaging portion proximate a second end that is configured to engage a bottom surface of the ski proximate outer edges thereof. The device includes at least one wheel attached to the first and second legs between the first end and the second end and a cross bar that attaches the first and second legs proximate first ends thereof. The device includes a lever arm extending from the cross bar between the first and second legs wherein the lever arm is configured to be angularly positionable relative to the first and second spaced apart legs. A handle is attached to a distal end of the lever arm and has a surface configured to engage a tip end or a ski handle of the ski. The device includes a retaining member attached to the handle that is configured to engage the ski handle, wherein when the ski engaging portions engage a bottom surface of the ski and the retaining member engages the ski handle, the ski is elevated and the at least one wheel engages the ground surface such that the skis do not contact the ground surface as the snowmobile is moved.

28 Claims, 14 Drawing Sheets

(58) Field of Classification Search
USPC ....... 280/7.12, 9, 10, 11, 7.14, 809, 816, 13, 280/28.5, 767
See application file for complete search history.

(56) References Cited

U.S. PATENT DOCUMENTS

| | | | | |
|---|---|---|---|---|
| 1,947,154 A * | 2/1934 | Fox | ............... | B62B 13/18 280/8 |
| 2,195,656 A * | 4/1940 | Mound | ............... | B62B 13/18 280/8 |
| 2,236,331 A * | 3/1941 | Cofsky | ............... | B62B 13/18 280/8 |
| 3,437,354 A * | 4/1969 | Hetteen | ............... | B60P 3/062 180/182 |
| 3,570,617 A * | 3/1971 | O'Day | ............... | B62B 13/18 180/184 |
| 3,709,512 A * | 1/1973 | Albertson | ............... | B62M 27/02 180/182 |
| 3,777,829 A * | 12/1973 | Rogers | ............... | B62M 27/02 180/184 |
| 3,810,662 A | 5/1974 | Commanda | | |
| 3,860,078 A * | 1/1975 | Stoick | ............... | B62B 13/16 180/183 |
| 4,046,392 A * | 9/1977 | Dredger | ............... | B62B 13/18 248/228.1 |
| 4,159,119 A * | 6/1979 | Smith | ............... | B62B 13/18 280/9 |
| 4,168,932 A | 9/1979 | Clark | | |
| 4,288,087 A * | 9/1981 | Morrison | ............... | B62B 17/00 180/182 |
| 4,516,744 A * | 5/1985 | Burnside | ............... | B60P 3/11 180/14.1 |
| 4,589,668 A * | 5/1986 | Mares | ............... | B62B 13/18 280/10 |
| 5,209,505 A * | 5/1993 | Bastille | ............... | B60P 3/062 280/79.11 |
| 5,439,237 A * | 8/1995 | Kutchie | ............... | B62B 19/02 280/11 |
| 5,441,378 A * | 8/1995 | Puls | ............... | B60P 3/062 254/8 R |
| 5,716,061 A * | 2/1998 | Sloan | ............... | B62B 1/06 254/131 |
| 6,015,254 A * | 1/2000 | Keeler | ............... | B62B 5/0083 254/131 |
| 6,527,282 B2 * | 3/2003 | Ouellette | ............... | B62K 13/00 280/28 |
| 6,824,147 B2 * | 11/2004 | Ouellette | ............... | B62B 13/18 280/28 |
| 6,848,718 B2 * | 2/2005 | Ravikumar | ............... | A63C 11/023 280/35 |
| 6,869,087 B2 * | 3/2005 | Veeser | ............... | B60P 3/062 280/79.11 |
| 6,889,987 B2 * | 5/2005 | Ouellette | ............... | B60S 9/14 280/7.12 |
| 6,983,943 B2 * | 1/2006 | Ouellette | ............... | B62B 13/18 280/28 |
| 7,290,774 B2 * | 11/2007 | Despres | ............... | B62B 13/18 180/182 |
| 7,500,678 B1 * | 3/2009 | Whiting | ............... | B64C 25/52 244/108 |
| 8,196,937 B2 * | 6/2012 | Sahlstorfer | ............... | B64F 1/22 244/103 R |
| 8,801,001 B2 * | 8/2014 | Ouellette | ............... | A63C 5/00 280/7.12 |
| 9,180,900 B2 * | 11/2015 | Ouellette | ............... | A63C 5/00 |
| 9,266,402 B2 * | 2/2016 | Lacombe | ............... | B62B 13/18 |
| D788,640 S * | 6/2017 | Larsson | ............... | D12/7 |
| 9,821,988 B2 * | 11/2017 | Thomsen | ............... | B66F 5/02 |
| 9,925,996 B2 | 3/2018 | Crynick | | |
| 10,059,362 B1 * | 8/2018 | Robillard | ............... | B62B 17/02 |
| 10,279,826 B2 | 5/2019 | Crynick | | |

OTHER PUBLICATIONS

Precision Metal Art; http://www.precisionmetalart.com/—skiwheels—.htm, 1 page, website accessed Jun. 27, 2019.

* cited by examiner

WHEELED DEVICE FOR SNOWMOBILE SKI

CROSS REFERENCE TO RELATED APPLICATION(S)

The present disclosure claims the benefit of U.S. Provisional Patent Application Ser. No. 62/548,648 entitled WHEELED DEVICE FOR SNOWMOBILE SKI that was filed on Aug. 22, 2017, the contents of which is incorporated by reference in its entirety.

BACKGROUND

The present disclosure relates to a device for attaching to a snowmobile ski. More particularly, the present disclosure relates to a wheeled device for attaching to a ski of a snowmobile to more easily move the snowmobile over a snow-free or ice-free surface.

Snowmobiles are vehicles configured to travel over snow and ice. Snowmobiles have tracks, typically with spaced apart lugs configured to penetrate snow and grip ice to propel the vehicle as the track is moved in a loop that is powered by an engine. Snowmobiles have skis located at the front of the vehicle to grip into snow and ice where the skis are used to the steer the vehicle. In order to effectively grip the snow and ice, the skis can have carbide runners that penetrate snow and grip ice.

While the skis with carbide runners are effective to steer the snowmobile over snow and ice, the skis with carbide runners are not efficient in moving the snowmobile over land or other dry surfaces, such as a floor of a building or a bed of a truck or trailer. When moving a snowmobile over or other dry surfaces, the skis have a tendency of sliding or skidding, which adversely affects the ability to steer the snowmobile. Additionally, the carbide runners and along with the skis can excessively wear over a short period of time when traveling over dry surfaces.

SUMMARY

An aspect of the present disclosure relates to a device for attaching to a ski of a snowmobile where the device includes first and second spaced apart legs. Each leg has a ski engaging portion proximate a second end that is configured to engage a bottom surface of the ski proximate outer edges thereof. The device includes at least one wheel attached to the first and second legs between the first end and the second end and a cross bar that attaches the first and second legs proximate first ends thereof. The device includes a lever arm extending from the cross bar between the first and second legs wherein the lever arm is configured to be angularly positionable relative to the first and second spaced apart legs. A handle is attached to a distal end of the lever arm and has a surface configured to engage a tip end or a ski handle of the ski. The device includes a retaining member attached to the handle that is configured to engage the ski handle, wherein when the ski engaging portions engage a bottom surface of the ski and the retaining member engages the ski handle, the ski is elevated and the at least one wheel engages the ground surface such that the skis do not contact the ground surface as the snowmobile is moved.

Another aspect of the present disclosure relates to a device for attaching to a ski of a snowmobile where the device includes first and second spaced apart legs. Each leg has a ski engaging portion proximate a second end that is configured to engage a bottom surface of the ski proximate outer edges thereof. The device includes at least one wheel attached to the first and second legs between the first end and the second end and a cross bar that attaches the first and second legs proximate first ends thereof. The device includes a lever arm extending from the cross bar between the first and second legs wherein the lever arm is configured to be angularly positionable relative to the first and second spaced apart legs. The device includes a retaining member attached to the lever arm and configured to engage the ski handle, wherein when the ski engaging portions engage a bottom surface of the ski and the retaining member engages the ski handle, the ski is elevated and the at least one wheel engages the ground surface such that the skis do not contact the ground surface as the snowmobile is moved.

DETAILED DESCRIPTION

Figure 1:
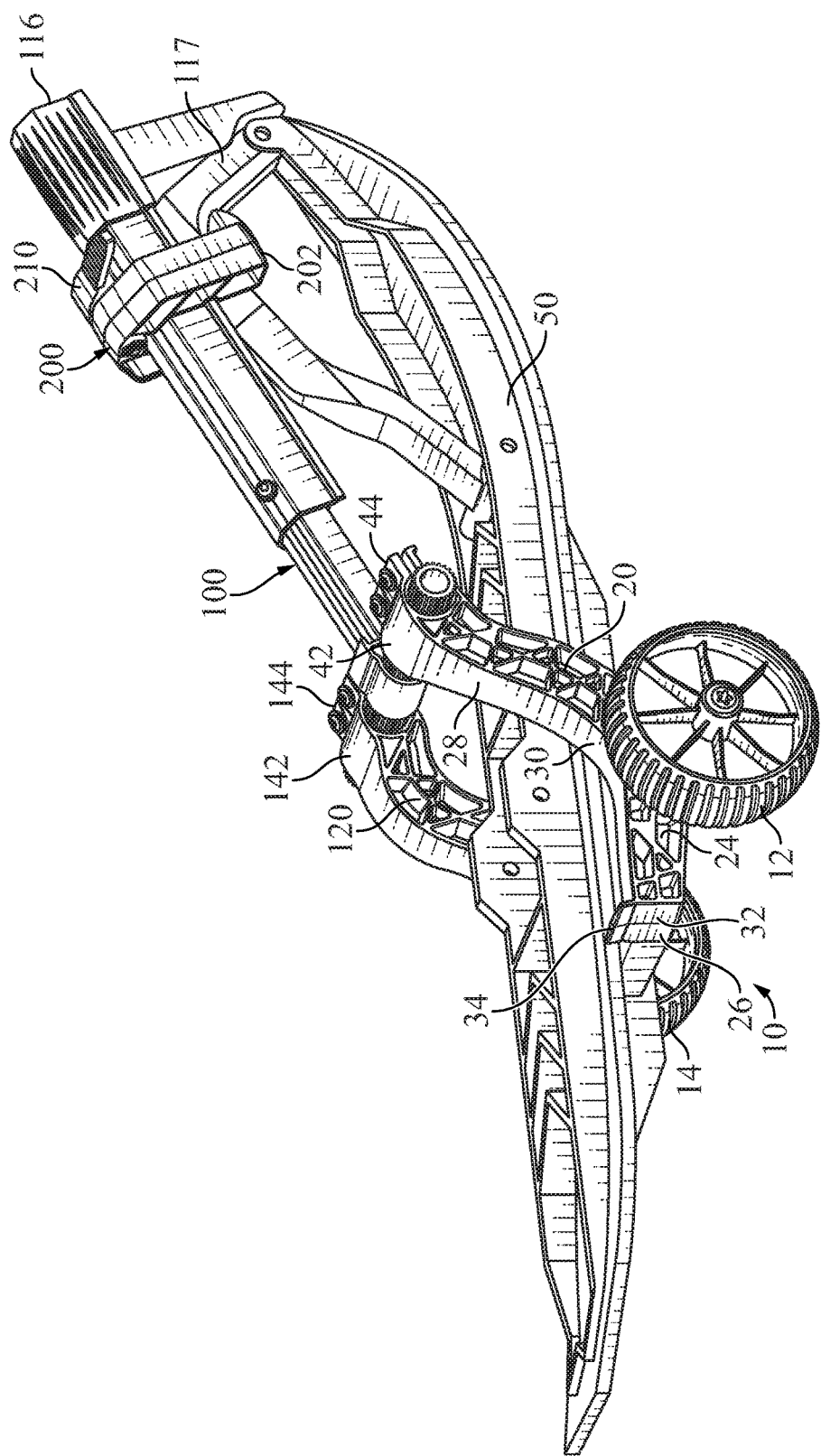
FIG. 1 is a perspective view of a wheeled device engaging a ski of a snowmobile.
Figure 2:
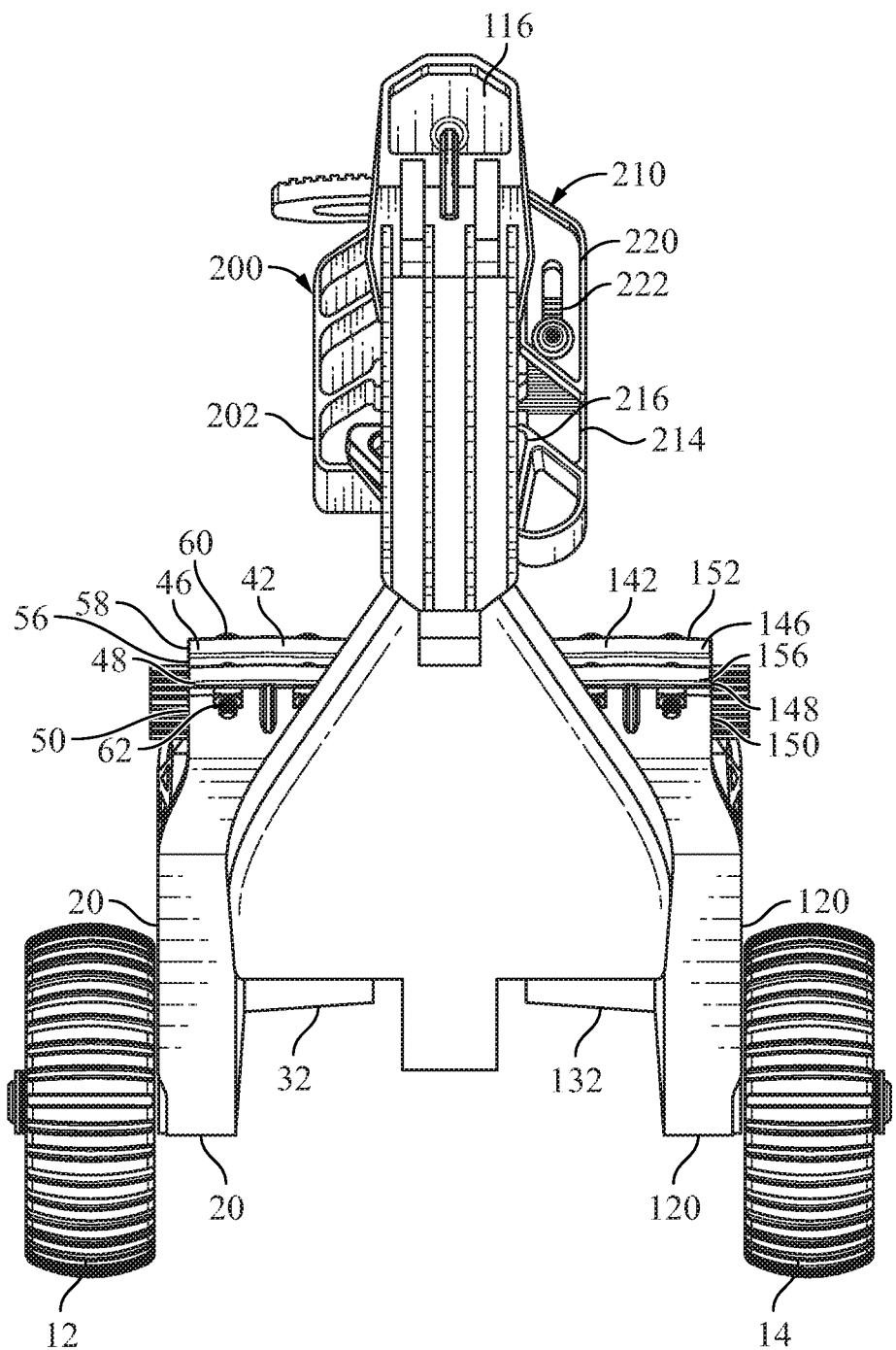
FIG. 2 is a front view of the wheeled device engaging the ski of the snowmobile.
Figure 3:
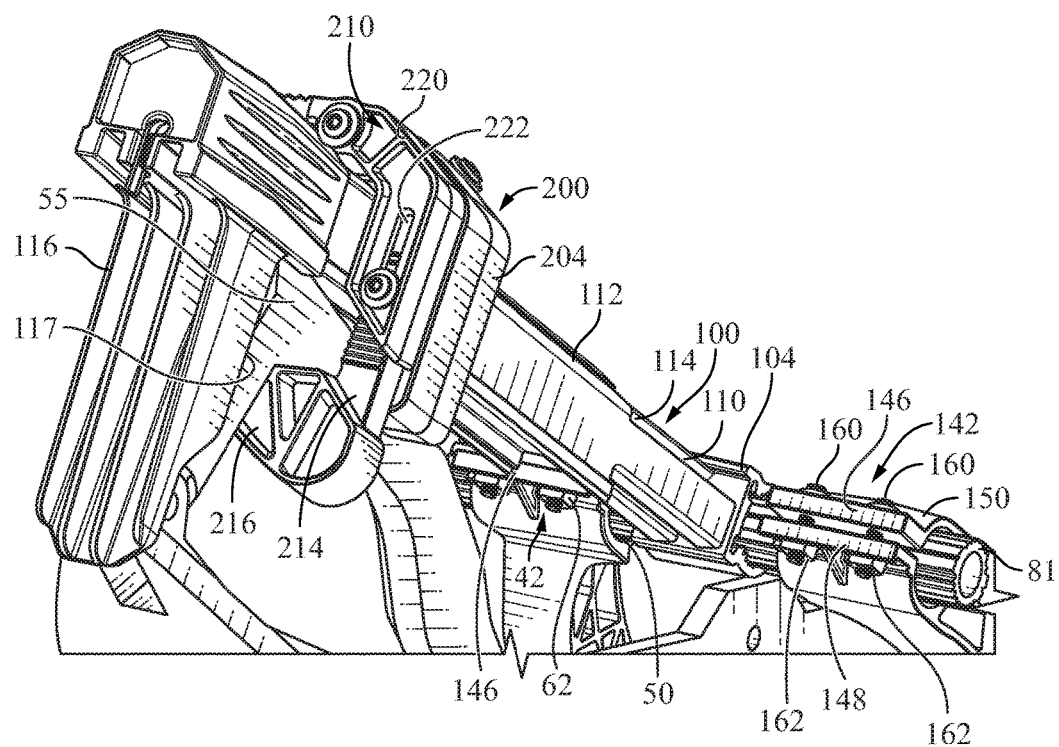
FIG. 3 is a perspective view of a front portion of the wheeled device engaging a front portion of the ski of the snowmobile.
Figure 4:
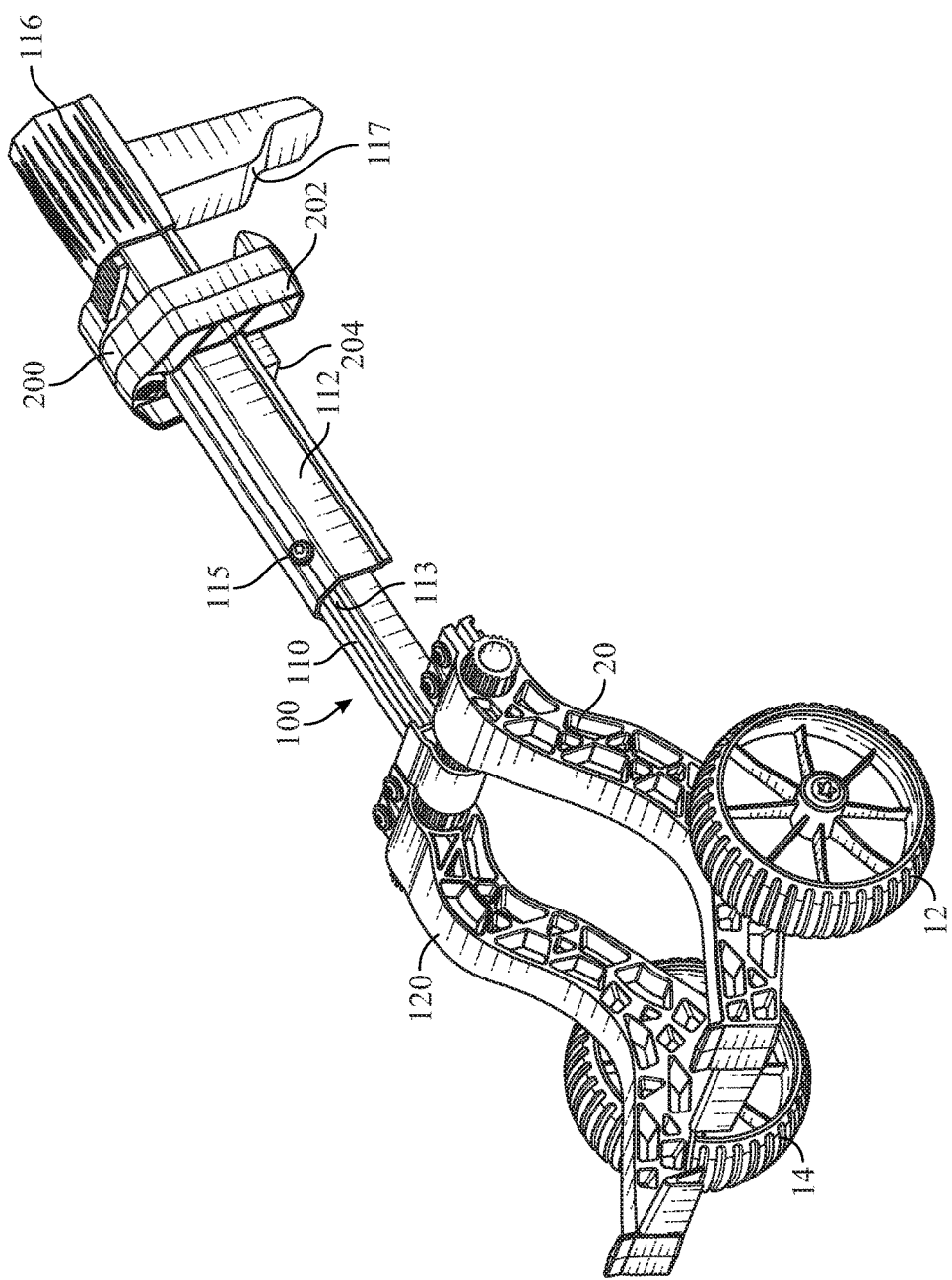
FIG. 4 is a perspective view of the wheeled device.
Figure 5:
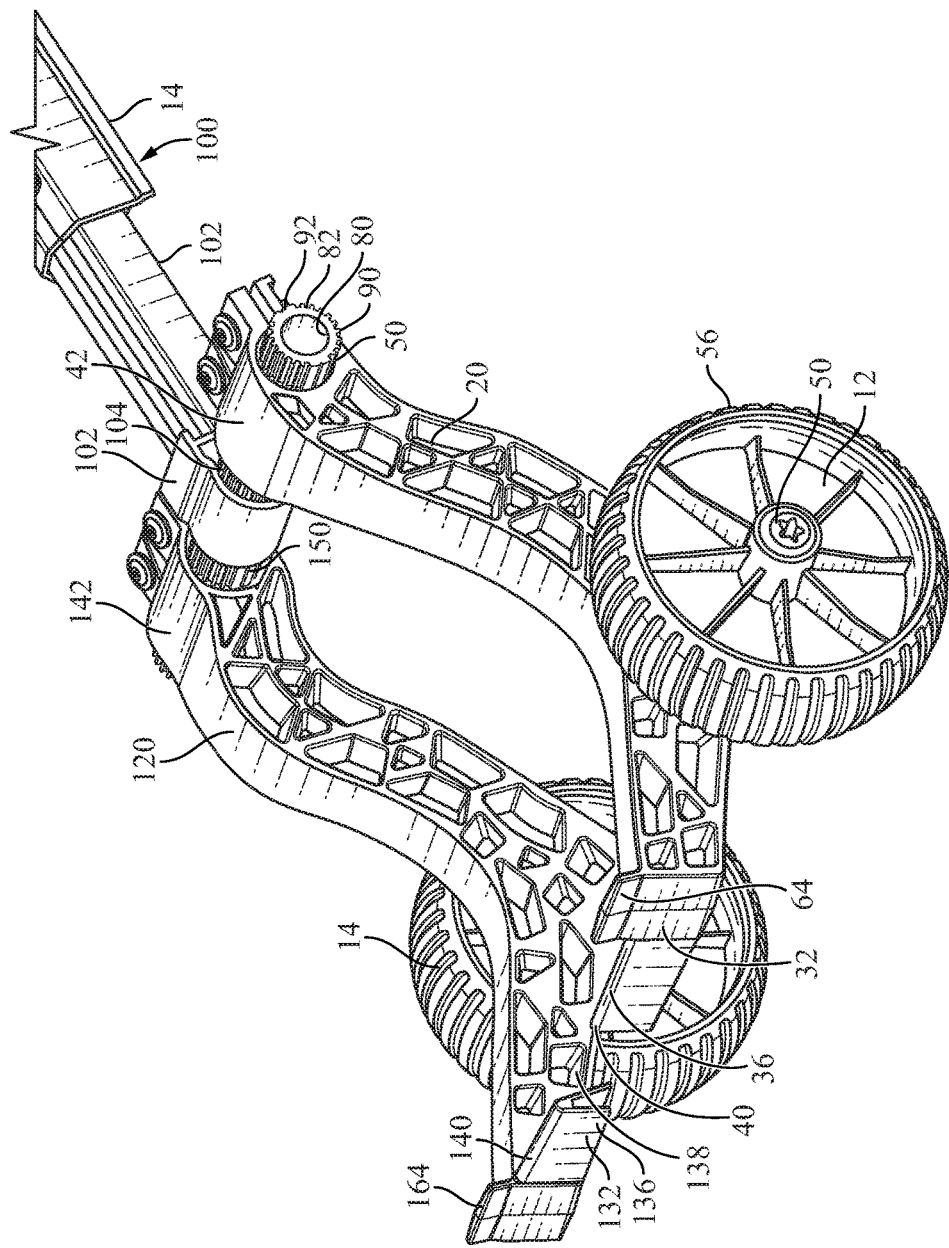
FIG. 5 is another perspective view of the wheeled device.

A wheeled device for removably attaching to a ski of a snowmobile is generally illustrated in FIGS. 1-5 at 10. The device 10 is configured to be secured to a ski 50 of a snowmobile and raise the ski 50 above ground level such that the ski 50 is supported in an elevated position by a plurality of wheel 12 and 14. With the device 10 secured to the ski 50 and the plurality of wheels 12 and 14 engaging the ground surface, the snowmobile can be driven to a selected location, without causing damage to the ski 50 or carbide runners (not shown) on the ski. While FIG. 1 illustrates a wheeled device 10 secured to a single ski 50, it is understood that a second device 10 would be secured to a second ski (not shown) such that the snowmobile can be steered on dry land or other dry surfaces using the wheels 12 and 14 on the device 10.

The device 10 is assembled utilizing a plurality of part that are secured together with common tools, such as a hex key, which is commonly referred to as an Allen wrench. Because the device 10 can be easily assembled, it can be shipped in a compact, disassembled state. Further, the devices 10 can assembled to be mirror images of each other, making the securing the device 10 to the skis easier. As the device 10 can be installed on either ski, only one device 10 will be discussed an illustrated going forward.

The device 10 includes a left arm 20 and a right arm 120 that are substantially mirror images of each other. The left arm 20 includes a substantially flat portion 24 proximate a back end 26 that transitions to an arcuate, upwardly angled portion 28 through an arcuate middle portion 30.

The arms are typically molded from a polymeric material such that the arms have a monolithic or unitary construction. However, other materials of construction can also be utilized, including an aluminum tube that can be bent to a desired configuration or cut and welded into a desired configuration. Additional materials of construction include steel plate, an aluminum I-beam and steel insert with a polymeric over-mold.

The left arm 20 includes a ski engaging member 32 that extends inwardly from a location proximate the back end 26. The ski engaging member 32 has an upper surface 34 that is configured to engage a bottom surface 52 of the ski 50. As illustrated, the ski engaging member 32 includes a substantially vertical portion 36 and an angled portion 38 connected with an arcuate portion 40 that includes the upper surface 34.

The left arm 20 includes a clamp 42 proximate a front end 44. The clamp 42 includes a top member 46 and a bottom member 48 that define a clamping bore 50. The top member 46 includes a front portion 52 having one or more bores and the bottom member 48 includes a similar front portion 56 having one or more bores, where the bores align and accept a bolt 60 such that as the bolt 60 threadably engages a nut 62, the bore 50 constricts and secures a cross bar 80 therein.

The arm 20 includes a through bore (not shown) in the arcuate middle portion that accepts a bolt 52 that is also positioned through a bore in a hub 54 of a wheel 12 such that the bolt 52 is an axle about which the wheel 12 rotates. In other embodiments, the wheel is attached to a bracket extending below the arms 20 and 120, which can provide additional clearance between the ski and the ground surface. Additionally, a single wheel can be attached to the brackets below the arms 20 and 120, to provide additional clearance and in some instances improved maneuvering capabilities.

The arm 20 includes a tab 64 proximate an outer edge of the arm 20 and proximate the back end 26. The tab 64 is configured to engage an outer edge of the ski 50 to prevent lateral movement of the ski on the device 10. The tab 64 as illustrated has a smooth surface for engaging the carbide of the ski. However, the tab 64 can be knurled or have grip tape applied thereto to increase the grip between the carbide on the ski and the tab 64. In other embodiments, a vertical surface proximate the tab 64 has a layer of compressible material, such as rubber, to provide a bumper between the arms 20 and the ski as the ski is positioned on the device 10.

Figure 6:
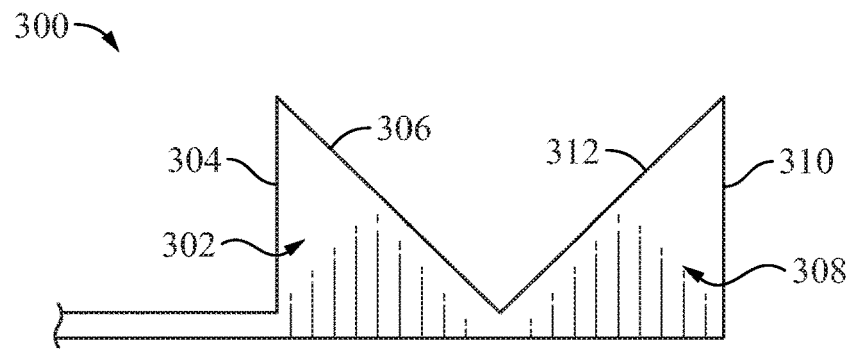
FIG. 6 is schematic view of a carbide retaining member on an arm of the wheeled device

Referring to FIG. 6, another tab is illustrated at 300. The tab 300 has a left tooth 302 having a substantially vertical surface 304 and an angled surface 306 extending upwardly therefrom. The tab 300 includes a right tooth 308 that is substantially the mirror image of the tooth 302. The right tooth 308 has a substantially vertical surface 310 and an angled surface 312. The angled surfaces 306 and 308 form a "V" shaped channel that accept and center the carbide on the tab 300 as the ski is positioned on the device 10.

Figure 7:
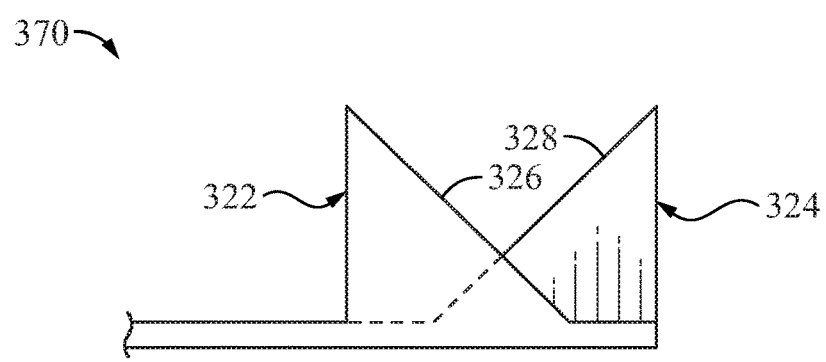
FIG. 7 is a schematic view of another embodiment of a carbide retaining member on an arm of the wheeled device.

Referring to FIG. 7, another configuration of a tab 320 is illustrated. The tab 320 includes raised left and right teeth 322 and 324. The left tooth 322 includes an angled surface 326 that overlaps with an angled surface 328 on the right tooth 324 to form opposing surfaces that engage the carbide on the ski. The teeth 322 and 324 may slightly flex to ensure the carbide is retained therebetween.

Figure 8:
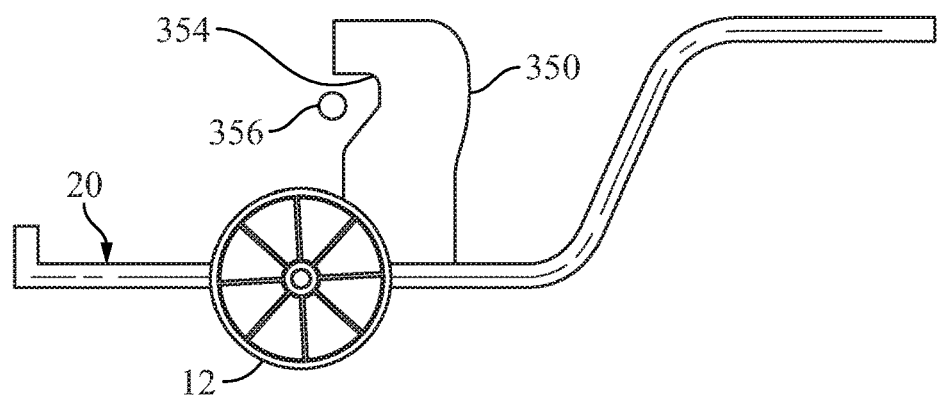
FIG. 8 is a schematic view of a stop attached to the arms.

Referring to FIG. 8, in another embodiment, an optional stop 350 is attached to the arms 20 and 120. The stop 350 is located proximate the wheel 12 and includes an indention 354 configured to engage a cross brace 356 on the ski. The engagement of the cross brace 356 with indention 354 prevents the ski from moving excessively forward on the device 10.

The arm 120 is the mirror image of the arm 20. Similar portions and features of the arm 120 to that of the arm 20 are given a reference character that is one hundred higher than the portions and features of the arm 20. For instance, the substantially flat portion of the arm 120 is given reference character 124 while the substantially flat portion of the arm 20 is given reference character 24.

The cross bar 80 is constructed from a rigid material, such as a metal, and has a plurality of teeth 82 extending from a first end 86 to a second end 88. The cross bar 80 includes raised flat portions 90 and 92 extending from the first end 86 to the second end 88. An exemplary, but non-limiting, material of construction for the cross bar 80 is aluminum because it is lightweight and strong.

A mounting bracket 102 attached to a lever arm 100 is positioned over the cross bar 80. The mounting bracket 102 has a bore 104 having a complimentary configuration to that of the cross bar 80, where grooves in the bore 104 accept the teeth 82 in the cross bar 80 and channels in the bore accept the raised flat portions 90 and 92. The engagement of the teeth 82 with the grooves and the raised flat portions 90, 92 with the channels allows the mounting bracket 102 to slide over the cross bar 80 while preventing rotational movement of the lever arm 100 above the cross bar 80. The clamps 42 and 142 of the arms 20 and 120 are positioned about the cross bar 80 proximate ends 79 and 81 and on opposite sides of the lever arm 100.

The lever arm 100 is rotated with the cross bar 80 within the clamps 42 and 142 to a selected location relative to the left and right arms 20 and 120, respectively, to provide a proper configuration for a particular ski. The bolts 60 and 160 threadably engage the nuts 62 and 162 in each of the clamps 42 and 142 to constrict the clamping bores 50 and 150 about the cross bar 80 to secure the lever arm 100 in a selected position relative to the arms 20 and 120.

The lever arm 100 includes a back member 110 secured to the mounting bracket 104 and a front member 112 in sliding engagement with the back member 110. The back member 110 includes left and right channels 109 and 111 that engage left and right slides 113 and 114 in the front member 112 which allows the front member to move along the length of the back member 110 to adjust a length of the lever arm 100 while preventing rotational movement of the front member 112 about the back member 110. The back member is 110 is secured to the front member 112 with a set screw to retain the lever arm 100 at a selected length for a particular ski.

The lever arm 100 include a handle portion 116 at a distal end of the front member 112. The handle portion 116 provides a gripping surface for moving the front member 112 relative to the back member 110 to adjust the length of the lever arm 100. The handle portion 116 also includes a surface 117 configured to engage a ski tip and/or a ski handle 55.

The device 10 includes a substantially "U" shaped guide 200 attached to the front member 112. The guide 200 includes left and right portions 202 and 204 that extend below the lever arm 100. The left and right portions 202 and 204 prevent lateral movement of the ski handle 55 when the device is installed on the ski 50.

The device also includes a hook member 210 attached to the guide 200. The hook member 210 include a substantially "J" shaped moveable member 212 that include a vertical portion 214 and a portion 216 extending from the vertical portion 214. The portion 216 is configured to engage the ski handle 55.

The hook member 210 include a mounting portion 220 that attaches to the guide 200 and has a channel 222 configured to accept the vertical portion 214 such that a location of the portion 216 can be adjusted relative to the lever arm 100 to compensate for differently configured skis and/or ski handles.

Figure 9:
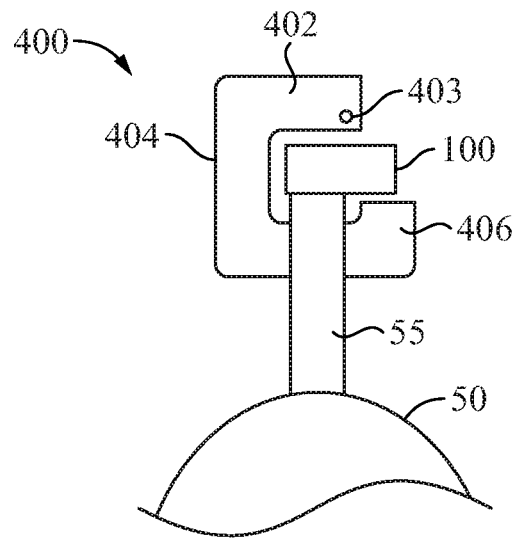
FIG. 9 is a schematic view of a hook for a ski pivotally attached to a lever arm.

Referring to FIG. 9, another configuration a hook member is illustrated at 400. The hook member 400 includes a top portion 402 that pivotally attaches to the lever arm 100 with a pivot pin 403. The hook member 400 includes a middle portion 404 extending from the top portion 402 and a hook portion 406 extending form the middle portion 404. To attach the hook member 400 to the ski handle 55, the ski 50 is lifted upward and the hook member 400 is rotated about the pivot pin 402 until the hook portion 406 is below the ski handle 55, at which time the ski is lowered to engage the hook portion 406 with the ski handle 55.

Figure 10:
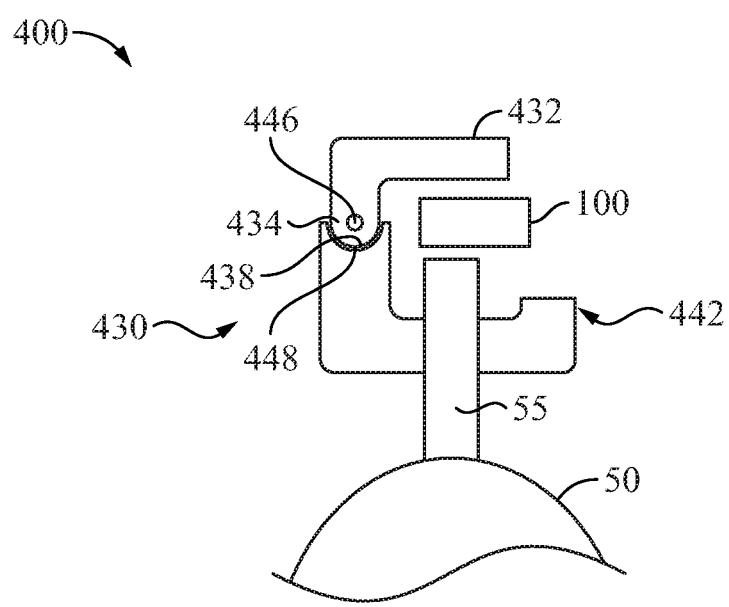
FIG. 10 is schematic view of a hook with a side pivot.
Figure 10A:
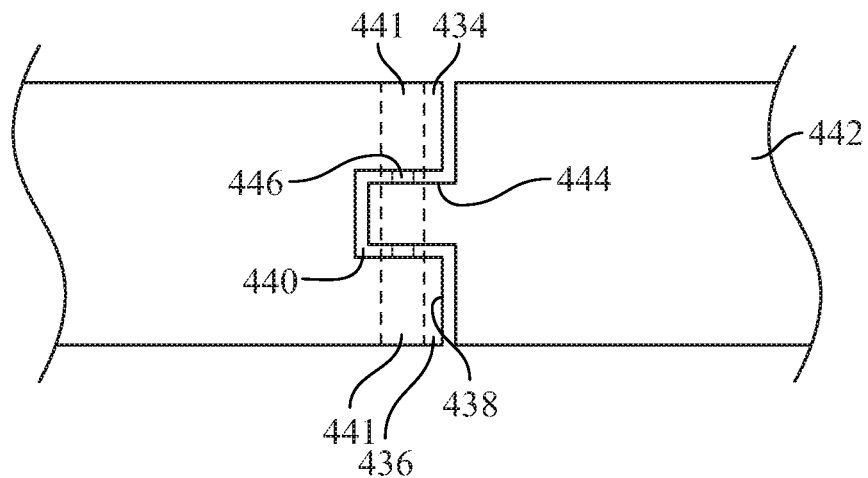
FIG. 10a is a side view of the hook with side pivot as illustrated in FIG. 10.

FIG. 10 illustrates another embodiment of a hook member at 430. The hook member includes a mounting member 432 that is attached to the lever arm 100. The mounting member 432 has spaced apart tabs 434 and 436 at a distal end 438 that define a gap 440. The tabs 434 and 436 have arcuate convex surfaces 438 and aligned apertures 441.

The hook member 430 includes a retaining portion 442 having a tab 444 at a proximal end that is configured to be positioned in the gap 440. The tab 444 has an aperture that aligns with the apertures 441 in the tabs 434 and 436 such that a pivot pin 446 can be positioned therein to pivotally attach the retaining portion 442 to the mounting member 432. The retaining portion 442 has arcuate concave surfaces 448 that are positioned proximate the convex surfaces 438 and allow the retaining portion to pivot about the pivot pin 442.

To attach the retaining portion 442 to the ski 50, the ski 50 is lifted to a selected position and the retaining portion 442 is pivoted about the pivot pin 442 until the retaining portion 442 is beneath the ski handle 55. The ski 50 is then lowered to cause the ski handle 55 to engage the retaining portion 442.

Figure 11:
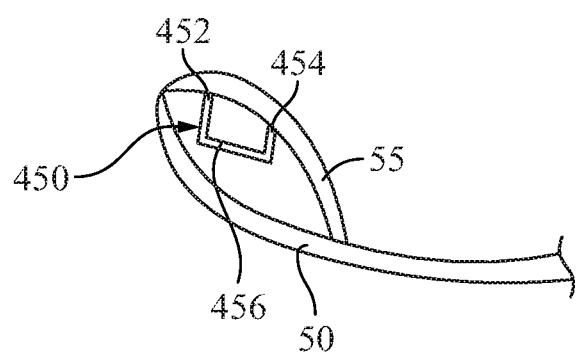
FIG. 11 is a schematic view of a bracket attached to a ski handle.
Figure 12:
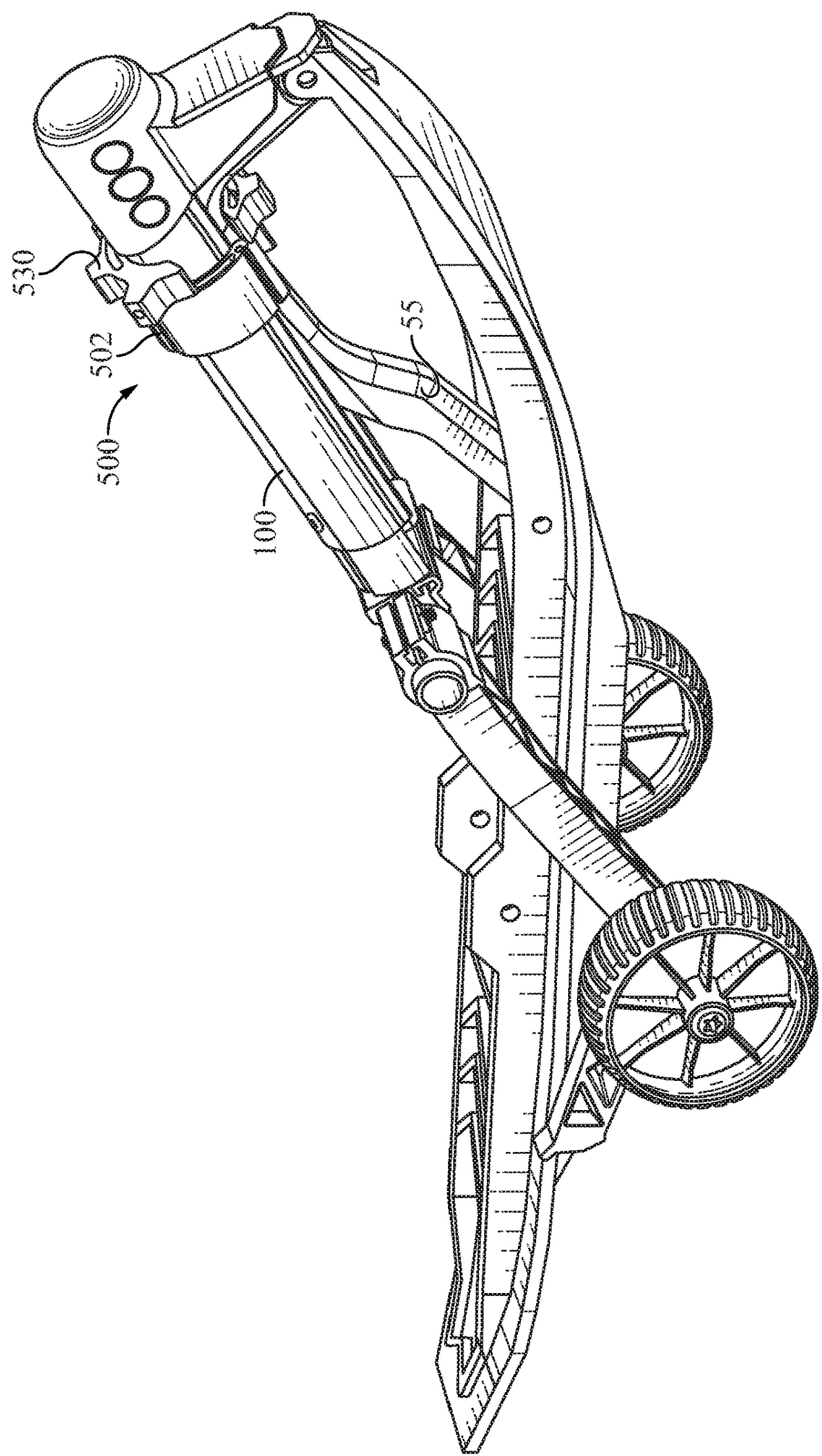
FIG. 12 is a perspective view of the wheeled device with a twisting retaining mechanism.
Figure 13:
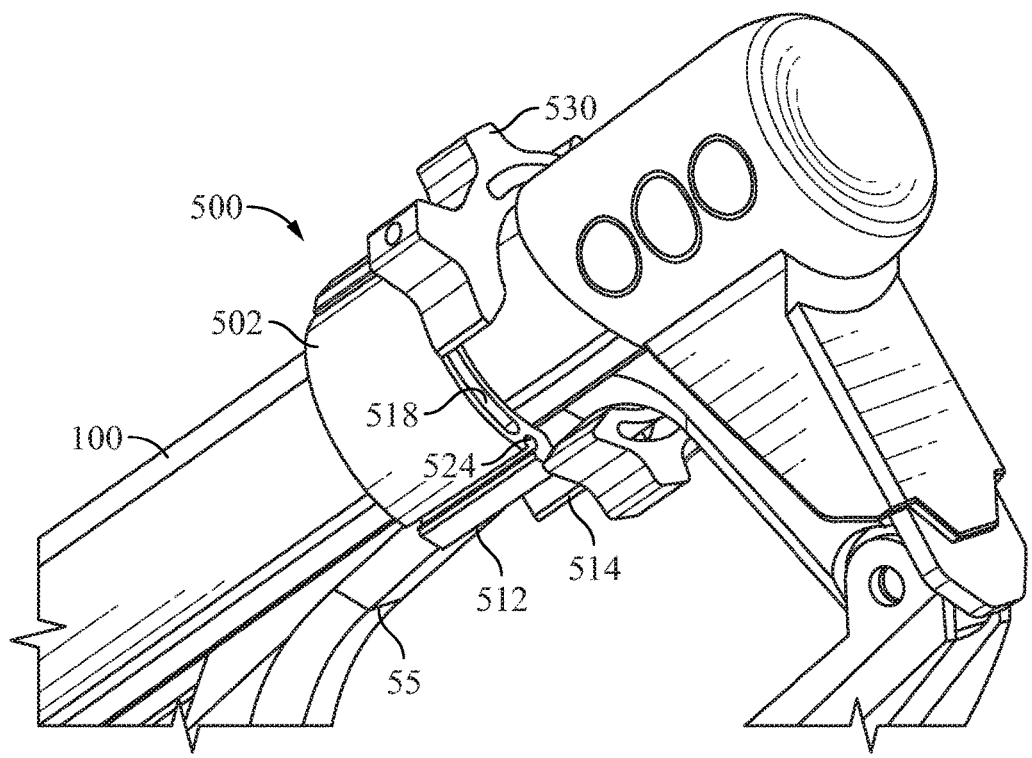
FIG. 13 is an enlarged view of the twisting retaining mechanism.

Referring to FIG. 11, a U shaped bracket 450 is attached to the ski handle 55. The bracket 450 limits sliding movement of the attaching mechanism of the device 10 to the ski handle 55 to be between points 452 and 454 of connection with the ski handle 55. As such a strap can be positioned between the points 452 and 454 and a middle portion 456 to attached the ski handle 55 to the lever arm 100. In one embodiment a hook and loop fastening system is attached to the strap, such as that sold under the VELCRO® trademark.

Referring back to FIGS. 1-5, the device 10 is positioned about the ski 50 by first positioning the arms 20 and 120 over the top of the ski handle 55 such that the ski engaging members 32 and 132 are located below the ski 50 where the ski engaging members 32 and 132 are spaced apart to allow a stabilizing bar 56 of the ski 50 to be located therebetween. With the ski engaging member 32 and 132 located below the ski 50, the ski 50 is raised by grasping the ski handle 55 and lift the ski 50. With the ski 50 elevated, the device is move along the ski 50 until the wheels 12 and 14 are located below the junction of the steering mechanism with ski 50 so that the wheels 12 and 14 are aligned with the steering mechanism.

The lever arm 100 is then lowered with manual force so that the portion 216 of the substantially "J" shaped member 212 is located within the space between the ski handle 55 and the ski 50. The ski 50 is then released, resulting in the portion 216 engaging the ski handle 55 and the weight of the ski (and snowmobile) causes the ski engaging members 32 and 132 are raised to engage the bottom of the ski 50 through a lever action where the wheels 12 and 14 act as the fulcrum.

The length of the lever arm 100 can be adjusted by moving the front member 112 over the back arm 110 such that the surface 117 of the handle portion 116 engages the ski tip and/or the ski handle 55. A bolt or set screw 115 is then utilized to retain the lever arm 100 at the selected length.

The surface 117 of the handle 116 engaging the ski tip and/or ski handle 55 prevents the ski 50 from moving forward on the device. Further the left and right portions 202 and 204 on the guide 200 prevent lateral movement of the ski handle 55 and, therefore, the ski 50 on the device 10.

With the device 10 secured on both skis 50 on the snowmobile, the track and wheels 12 and 14 are used to move the snowmobile to a selected location without damaging the skis and/or carbide runners The device 10 removed from the ski 50 by lifting the ski handle 55 to remove weight of the ski (and snowmobile) from the device 10. The portion 216 of the substantially "J" shaped member 212 is displaced from the ski handle 55 and the device 10 is rolled on the wheels 12 and 14 off of the ski 50.

Referring to FIGS. 12-15, the wheeled device is illustrated with a ski having a ski handle 55 where the device has a twisting or rotating retaining mechanism 500. A member of the retaining mechanism 500 is rotated in one direction to accept the ski handle 55 and is rotated in an opposite direction to retain the ski handle 55.

The retaining mechanism 500 includes a collar 502 that is frictionally secured to the lever arm 100. The collar 502 is arcuate in configuration and includes a first end 512 and a second end 514 separated by a gap.

The collar 502 includes a left arcuate slot 518 and top arcuate slot 520 and a right arcuate slot 522 that extend from a front surface to a back surface. The collar 502 include a plurality of bore shaped channels 524 that interrupt an outer surface 526 of the collar 502.

The slots 518, 520 and 522 along with the channels 524 provide sufficient flexibility to the collar 502 such that as manual force is place on the collar 502 and the lever arm 100, the ends 512 and 514 spread apart to position the collar 502 about the lever arm 100. With the collar positioned about the lever arm 100, the ends 512 and 514 come closer together to frictionally secure the collar 502 to the lever arm 100.

Figure 14:
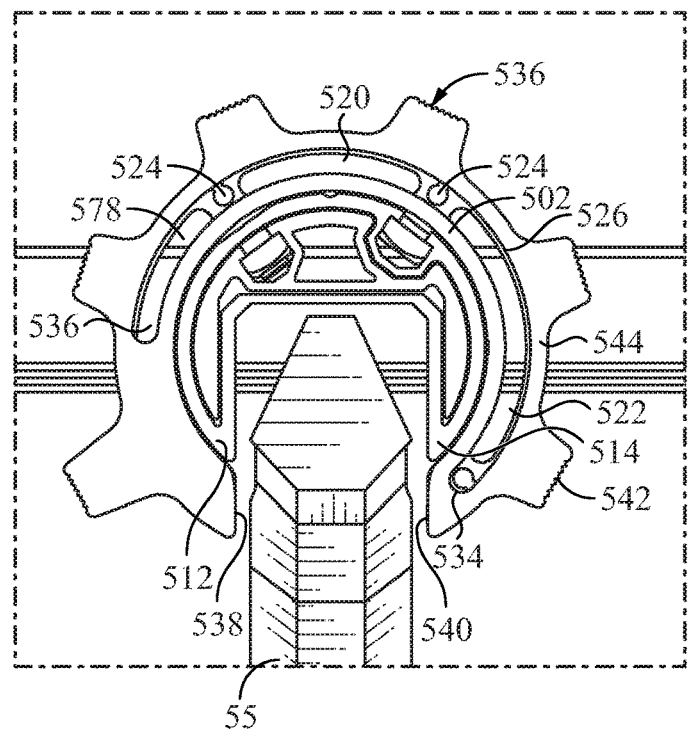
FIG. 14 is a front view of the retaining mechanism in an open position.
Figure 15:
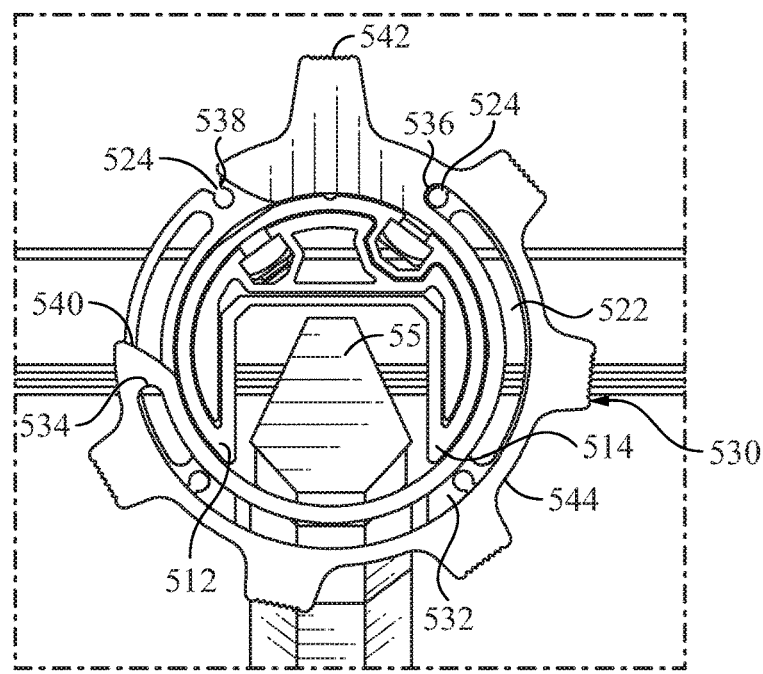
FIG. 15 is a front view of the retaining mechanism in a closed position.

The retaining mechanism 500 includes a retaining member 530 that is movably coupled to the collar 502 such that the retaining member 530 is positionable between an open position as illustrated in FIG. 14 and a closed position as illustrated in FIG. 15. The retaining member 530 has an arcuate configuration with left and right ends 538 and 540 separated by a gap.

The retaining member 530 has a slot 532 extending from a first end 534 to a second end 536. A pin (not shown) or other retaining device is positioned through the slot 532 and into the collar 502 to retain the member 530 to the collar 502 while allowing the retaining member to move relative to the collar 502.

The retaining member 530 includes a plurality of raised members 542 on an outer surface 544 that provide a gripping surface to better enable the movement of the retaining member 530 from the open position to the closed position, as illustrated in FIGS. 14 and 15, respectively.

Figure 16:
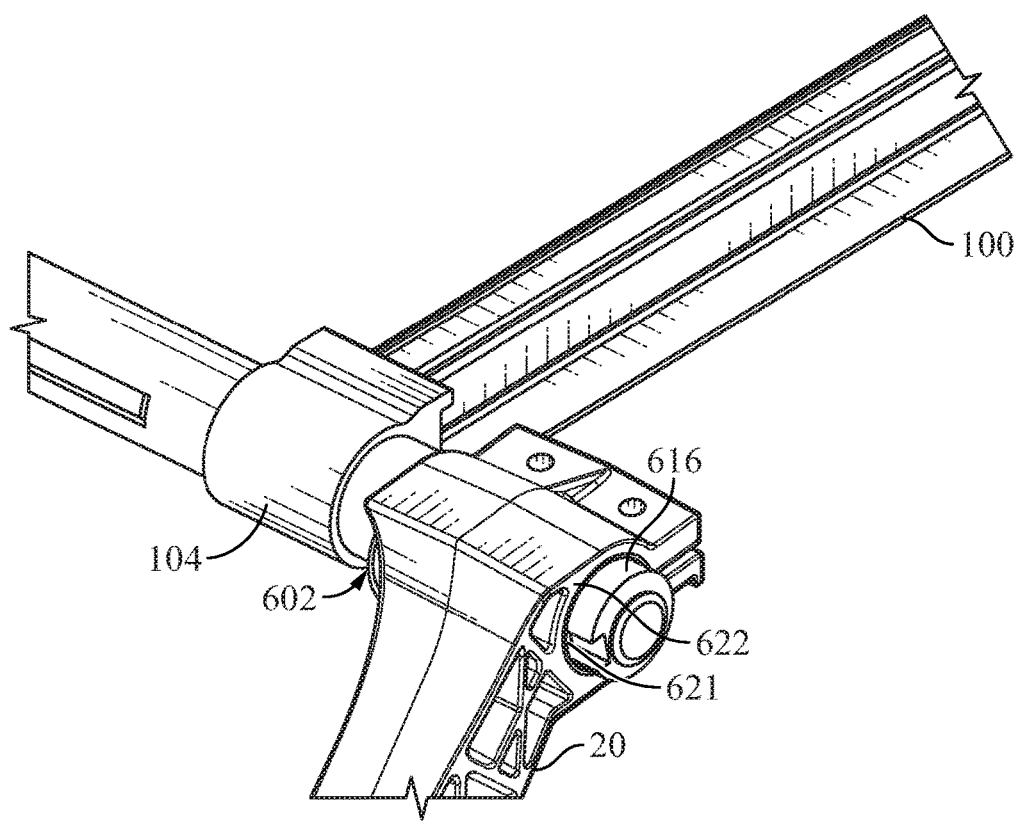
FIG. 16 is a perspective view of the wheeled device with a Hirth joint.
Figure 17:
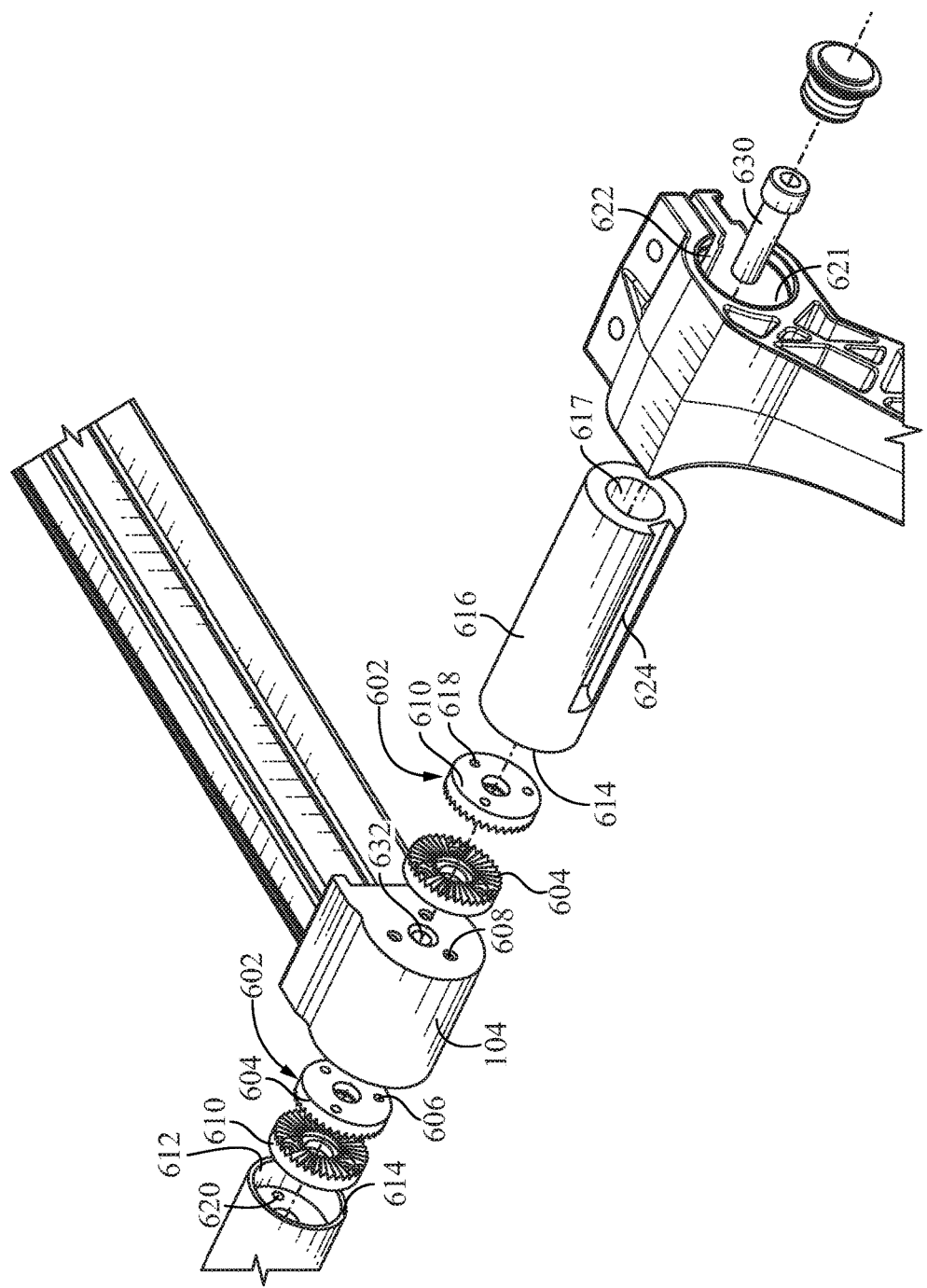
FIG. 17 is a partial exploded view of the wheeled device.
Figure 18:
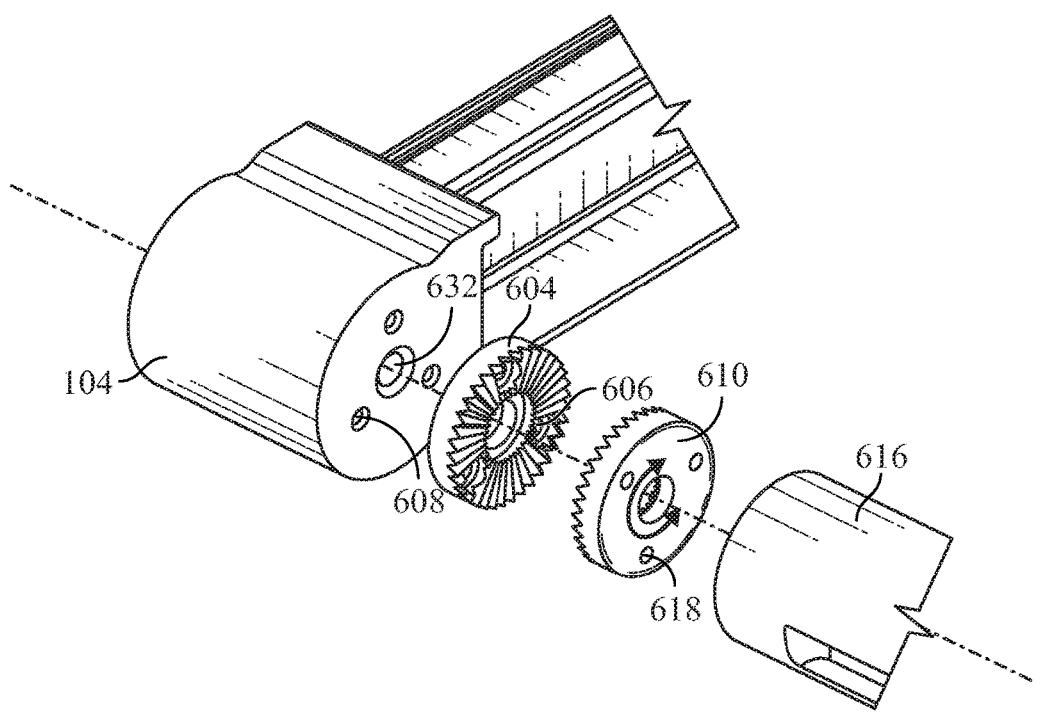
FIG. 18 is an exploded view of the Hirth joint.

Referring to FIGS. 16-18, another embodiment of the wheeled device is illustrated at 600. The wheeled device 600 utilizes a plurality of Hirth joints 602 instead of the clamps 42 and 142 to position the lever arm 100 relative to the arms 20 and 120. First portions 604 of the Hirth joints 602 are secured to opposite sides of the mounting bracket 104 with a plurality of bolts positioned through apertures 606 in the first portions 604 and into threaded bores 608 in the mounting bracket 104.

Second portions 610 of the Hirth joint are positioned within cavities 612 in an inner end 614 of a shaft 616. The second portions 610 are secured to the shafts 616 with bolts that are positioned through apertures 618 in the second portions and threadable engage bores 620 in the shafts.

With the first and second portions 604 and 610 secured to the mounting bracket 104 and the shafts 616, the arms 20 and (not shown) are positioned over the shafts 616 such that a key 621 in a clamping bore 622 engages a key slot 624 in the shaft 616 such that the arm 20 does not rotate relative to the shaft 616.

A bolt 630 is positioned through a through bore 617 in the shaft and into a threaded bore 632 in the mounting bracket 104. The lever arm 100 is positioned into a selected angular position relative to the arm 20 and the bolt is tightened such that radial teeth in the first portion 604 engages the radial teeth in the second portion 610 to retain the lever arm 100 and the arm 20 in the selected configuration.

To change the radial position of the lever arm 100 relative to the arm 20, the bolt 630 is loosened to disengage the radial teeth in the first and second portion 604 and 610 to allow the lever arm to pivotally move to a second radial position. When in the second radial position, the bolt 630 is retightened to secure the first and second portions 604, 610 together. As such, the Hirth joint allows the lever arm 100 to be radially positioned relative to the arm 20 to adapt to any configuration of the ski 50.

The key and the key slot 624 allow the arm 20 to move relative to the shaft to adapt the position of the arms 20, 120 to the width of the ski 50. To move the arms 20, 120, bots in the clamping members 640 are loosened to expand the clamping bore. The arms 20, 120 can move relative to the shafts 616.

The bolts are then tightened to constrict the clamping bore and retain the arms 20, 120 in a selected position on the shafts 616. As such, the width of the arms 20, 120 and the configuration of the lever arm 100 relative to the arms 20, 120 can be adjusted to accommodate most if not all skis of a snowmobile.

Although the present invention has been described with reference to preferred embodiments, workers skilled in the art will recognize that changes may be made in form and detail without departing from the spirit and scope of the invention.

The invention claimed is:

1. A device for attaching to a ski of a snowmobile, the device comprising:
    first and second spaced apart legs, each leg having a first end and a second end, wherein each leg includes a ski engaging portion proximate the second end that is configured to engage a bottom surface of the ski proximate outer edges thereof;
    at least one wheel attached to the first and second legs between the first end and the second end;
    a cross bar attaching the first and second legs proximate the first ends;
    a lever arm extending from the cross bar between the first and second legs wherein the lever arm is configured to be angularly positionable relative to the first and second spaced apart legs;
    a handle attached to a distal end of the lever arm, the handle having a surface configured to engage a tip end or a ski handle of the ski; and
    a retaining member attached to the handle and configured to engage the ski handle, wherein when the ski engaging portions engage a bottom surface of the ski and the retaining member engages the ski handle, the ski is elevated and the at least one wheel engages the ground surface such that the skis do not contact the ground surface as the snowmobile is moved.

2. The device of claim 1, wherein each leg of the first and second legs further comprises an upwardly extending tab configured to engage side surfaces of the ski and to limit lateral movement of the ski on the device.

3. The device of claim 1, wherein the upwardly extending tab has a plurality of sloped surfaces configured to engage a carbide on the ski.

4. The device of claim 1, wherein each of the first and second legs comprises a clamping member proximate the first end, where the clamping member comprises:
    a top member;
    a bottom member, wherein the top member and the bottom member define a clamping bore into which the cross bar is positioned; and
    at least one securing mechanism that is configured to position the clamp into a first position where the clamp engages the cross bar to fix the angular position of the lever arm relative to the first and second legs and wherein the securing mechanism is configured to position the clamp in a second position wherein the cross bar and the lever arm can rotate within the clamping bore.

5. The device of claim 4, wherein the at least one securing mechanism comprises a plurality of spaced apart bolts and nuts.

6. The device of claim 4, wherein the cross bar comprises a plurality of teeth, the plurality of teeth being configured to be positioned with the clamp.

7. The device of claim 1, wherein each arm comprises a first portion of a Hirth joint non-rotatably secured thereto.

8. The device of claim 7, wherein the cross bar comprises a second portion of a Hirth joint non-rotatably secured to opposing ends thereof.

9. The device of claim 8, and further comprising a securing mechanism configured to position and retain the first and second portion in a first position where the first and second portions of the Hirth joint are non-rotatably secured to each other and a second position where the first and second portions of the Hirth joint are rotatable relative to each other.

10. The device of claim 1, wherein the retaining member comprises a monolithic member comprising:
  a downwardly extending portion; and
  a lateral portion extending from the downwardly extending portion wherein the lateral portion is configured to engage the ski handle.

11. The device of claim 1, wherein the retaining member comprises:
  a first portion attached to the handle; and
  a second portion hingedly attached to the first portion wherein the second portion is positionable into a first position wherein the second portion engages the ski handle and a second position where the second portion is displaced from the ski handle.

12. The device of claim 1, wherein the retaining member comprises:
  a first portion non-rotatably attached to the handle, the first portion having a first channel configured to accept a portion of the ski handle; and
  a second portion rotatably secured to the first portion, the second portion having a second channel configured to pass the ski handle therethrough, wherein the second portion is positionable into a first position where the first and second channels are aligned such that the portion of the ski handle is positionable within the first channel and a second position wherein a portion of the second portion covers an entrance to the first portion to retain the ski handle to the retaining member.

13. The device of claim 1, wherein the at least one wheel comprises:
  a first wheel rotatably attached to the first leg; and
  a second wheel rotatably attached to the second leg.

14. A device for attaching to a ski of a snowmobile, the device comprising:
  first and second spaced apart legs, each leg having a first end and a second end, wherein each leg includes a ski engaging portion proximate the second end that is configured to engage a bottom surface of the ski proximate outer edges thereof;
  a first wheel rotatable attached to the first leg, between the first end and the second end thereof;
  a second wheel rotatable attached to the second leg, between the first end and the second end thereof;
  a cross bar attaching the first and second legs proximate the first ends;
  a lever arm extending from the cross bar between the first and second legs wherein the lever arm is configured to be angularly positionable relative to the first and second spaced apart legs; and
  a retaining member attached to the lever arm and configured to engage the ski handle, wherein when the ski engaging portions engage a bottom surface of the ski and the retaining member engages the ski handle, the ski is elevated and the at least one wheel engages the ground surface such that the skis do not contact the ground surface as the snowmobile is moved.

15. The device of claim 14, wherein each leg of the first and second legs further comprises an upwardly extending tab configured to engage side surfaces of the ski and to limit lateral movement of the ski on the device.

16. The device of claim 14, wherein the upwardly extending tab has a plurality of sloped surfaces configured to engage a carbide on the ski.

17. The device of claim 14, wherein each of the first and second legs comprises a clamping member proximate the first end, where the clamping member comprises:
  a top member;
  a bottom member, wherein the top member and the bottom member define a clamping bore into which the cross bar is positioned; and
  at least one securing mechanism that is configured to position the clamp into a first position where the clamp engages the cross bar to fix the angular position of the lever arm relative to the first and second legs and wherein the securing mechanism is configured to position the clamp in a second position wherein the cross bar and the lever arm can rotate within the clamping bore.

18. The device of claim 17, wherein the at least one securing mechanism comprises a plurality of spaced apart bolts and nuts.

19. The device of claim 17, wherein the cross bar comprises a plurality of teeth, the plurality of teeth being configured to be positioned with the clamp.

20. The device of claim 14, wherein each arm comprises a first portion of a Hirth joint non-rotatably secured thereto.

21. The device of claim 20, wherein the cross bar comprises a second portion of a Hirth joint non-rotatably secured to opposing ends thereof.

22. The device of claim 21, and further comprising a securing mechanism configured to position and retain the first and second portion in a first position where the first and second portions of the Hirth joint are non-rotatably secured to each other and a second position where the first and second portions of the Hirth joint are rotatable relative to each other.

23. The device of claim 14, wherein the retaining member comprises a monolithic member comprising:
  a downwardly extending portion; and
  a lateral portion extending from the downwardly extending portion wherein the lateral portion is configured to engage the ski handle.

24. The device of claim 14, wherein the retaining member comprises:
  a first portion attached to the handle; and
  a second portion hingedly attached to the first portion wherein the second portion is positionable into a first position wherein the second portion engages the ski handle and a second position where the second portion is displaced from the ski handle.

25. The device of claim 14, wherein the retaining member comprises:
  a first portion non-rotatably attached to the lever arm, the first portion having a first channel configured to accept a portion of the ski handle; and
  a second portion rotatably secured to the first portion, the second portion having a second channel configured to pass the ski handle therethrough, wherein the second portion is positionable into a first position where the first and second channels are aligned such that the portion of the ski handle is positionable within the first channel and a second position wherein a portion of the second portion covers an entrance to the first portion to retain the ski handle to the retaining member.

26. The device of claim 14, wherein the at least one wheel comprises:
  a first wheel rotatably attached to the first leg; and
  a second wheel rotatably attached to the second leg.

27. The device of claim 14, and further comprising:
  a handle attached to a distal end of the lever arm, the handle having a surface configured to engage a tip end or a ski handle of the ski.

28. The device of claim 14, wherein the lever arm further comprises:

a first portion non-rotatably secured to the cross bar; and
a second portion slidable over the first portion where the second portion is configured to be moved relative to the first portion to adjust a length of the lever arm.

* * * * *